(12) United States Patent
Maekawa et al.

(10) Patent No.: US 8,037,201 B2
(45) Date of Patent: Oct. 11, 2011

(54) CONTENT HOLDER UNIT, INFORMATION PROCESSING METHOD, AND PROGRAM

(75) Inventors: Hajime Maekawa, Osaka (JP); Kenichi Matsumoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 38 days.

(21) Appl. No.: 12/599,136

(22) PCT Filed: Apr. 23, 2008

(86) PCT No.: PCT/JP2008/001072
§ 371 (c)(1),
(2), (4) Date: Nov. 25, 2009

(87) PCT Pub. No.: WO2008/139700
PCT Pub. Date: Nov. 20, 2008

(65) Prior Publication Data
US 2010/0146090 A1    Jun. 10, 2010

(30) Foreign Application Priority Data

May 8, 2007 (JP) .................................. 2007-123180

(51) Int. Cl.
*G06F 15/16* (2006.01)

(52) U.S. Cl. .................. 709/232; 709/203; 709/227
(58) Field of Classification Search .......... 709/201–203, 709/219, 226, 227, 230–232
See application file for complete search history.

(56) References Cited

U.S. PATENT DOCUMENTS

| | | | | |
|---|---|---|---|---|
| 6,795,866 | B1 * | 9/2004 | Mankude et al. | 709/238 |
| 2004/0064481 | A1 * | 4/2004 | Azami | 707/104.1 |

OTHER PUBLICATIONS

Kontiki et al; "Multimedia Internet Encyclopedia . . . Kontiki Technology: The Mojo", 1999 Digital Creators Conference, 2000-2001 Kontiki Inc.

* cited by examiner

*Primary Examiner* — Yemane Mesfin
(74) *Attorney, Agent, or Firm* — Pearne & Gordon LLP

(57) ABSTRACT

Transmission fragment content information transmitted by a content holding device is made redundant. A content holding device comprises a content information storage section (22) for storing hold content information including at least fragment content information obtained by fragmenting a set of content information, an instruction information receiving section (21) for receiving instruction information to instruct the transmission of the fragment content information, a content information constructing section (25) for constructing the transmission fragment content information including the instruction fragment content information which is the fragment content information included in the hold content information and the fragment content information whose transmission is instructed by the instruction information and additional fragment content information which is the fragment content information included in the same hold content information as the instruction fragment content information and fragment content information different from the instruction fragment content information, and a content information transmitting section (26) for transmitting the transmission content information.

9 Claims, 9 Drawing Sheets

FIG. 6

| CORRESPONDENCE INFORMATION | | |
|---|---|---|
| CONTENT INFORMATION ID | | CONTENT HOLDER UNIT ID |
| SERIES-OF-PIECES-OF-CONTENT-INFORMATION ID | POSITIONAL INFORMATION | |
| FC001 | 1-20000 (A SERIES OF PIECES OF INFORMATION) | A001 |
| FC001 | 1-20000 (A SERIES OF PIECES OF INFORMATION) | A002 |
| FC001 | 1-20000 (A SERIES OF PIECES OF INFORMATION) | A003 |
| FC001 | 1-20000 (A SERIES OF PIECES OF INFORMATION) | A004 |
| FC002 | 1-5000 | A001 |
| FC002 | 5001-10000 | A005 |
| --- | --- | --- |

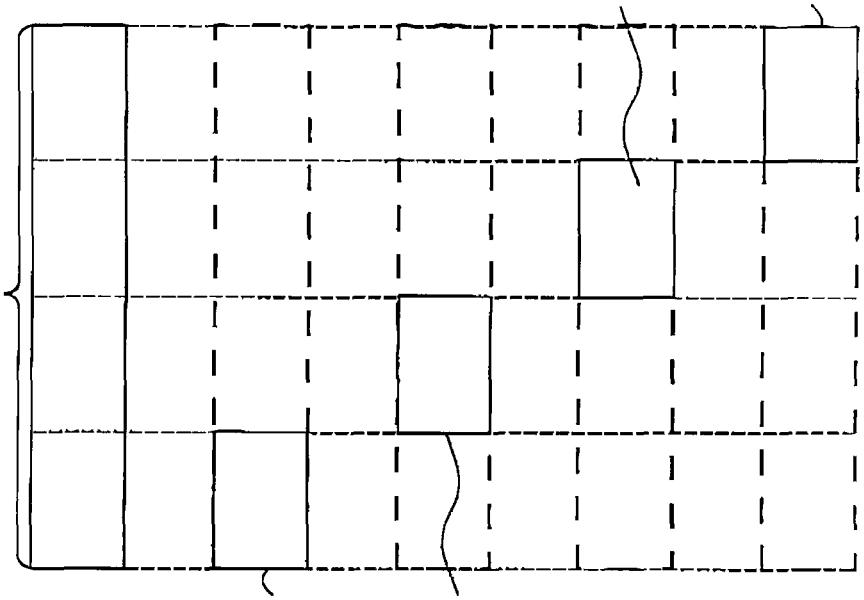

FIG. 10

| CORRESPONDENCE INFORMATION | | | |
|---|---|---|---|
| CONTENT INFORMATION ID | | | CONTENT HOLDER UNIT ID |
| SERIES-OF-PIECES-OF-CONTENT-INFORMATION ID | POSITIONAL INFORMATION | | |
| | 1-20000 (A SERIES OF PIECES OF INFORMATION) | | |
| FC001 | | 1-5000 | A001 |
| | | 5001-10000 | A002 |
| | | 10001-15000 | A003 |
| | | 15001-20000 | A004 |
| FC002 | | 1-5000 | A001 |
| | | 5001-10000 | A005 |
| ----- | | ----- | ----- |

CONTENT HOLDER UNIT, INFORMATION PROCESSING METHOD, AND PROGRAM

TECHNICAL FIELD

The present invention relates to a content holder unit, and the like, that keeps content information.

BACKGROUND ART

A hitherto-developed method is to fragment content information, at the time of transmission of content information, into a plurality of pieces and transmit the thus-fragmented pieces of information from a plurality of servers (see; for instance, Non-Patent Document 1).

Non-Patent Document 1: Multimedia Internet Encyclopedia "Kontiki Delivery Network," [online], [Searched on Mar. 30, 2007], Internet (URL: http://www.jiten.com/dicmi/docs/k/6780s.htm)

DISCLOSURE OF THE INVENTION

Problem that the Invention is to Solve

However, there is a case where any of fragmented pieces of content information fail to arrive at a content receiver for reasons of a poor state of a communication line, and the like. In such a case, a transmission request must again be transmitted in connection with the pieces of fragmented content information failed to arrive at the content receiver, which raises problems. Namely, corresponding additional processing must be performed, and receipt of the pieces of fragmented content information is delayed.

The present invention has been conceived to solve the problems and aims at providing a content holder unit, and the like, that transmits fragmented content information in such a way that, even when having failed to receive any of a plurality of pieces of fragmented content information, a content receiver can appropriately acquire a series of pieces of content information.

Means for Solving the Problem

To achieve the object, a content holder unit of the present invention corresponds to a content holder unit in an information communication system having one or two or more content holder units retaining content information and a content receiver for receiving fragmented transmission content information, the content holder unit comprising: a content information memory section that keeps retained content information including at least fragmented content information generated by fragmentation of a series of pieces of content information; a command information receiving section that receives command information corresponding to information for commanding transmission of fragmented content information; a content information configuration section that makes up fragmented transmission content information including fragmented command content information and additional fragmented content information, the fragmented command content information corresponding to fragmented content information included in retained content information and corresponding to fragmented content information whose transmission is commanded by means of command information received by the command information receiving section, and the additional fragmented content information corresponding to fragmented content information included in retained content information identical with the fragmented command content information and corresponding to fragmented content information differing from the fragmented command content information; and a content information transmission section that transmits fragmented transmission content information generated by the content information configuration section.

By means of the configuration, fragmented transmission content information including additional fragmented content information can be transmitted. As a consequence, for instance, even when the content receiver cannot receive any of the plurality of pieces of fragmented transmission content information, the content receiver can acquire a series of pieces of desired content information when additional fragmented content information received by the content receiver can cover fragmented command content information that should be included in the fragmented transmission content information that cannot have been received. In such a case, even when the content receiver cannot have received any of pieces of the fragmented transmission content information, it is not necessary to request re-transmission of the fragmented transmission content information that cannot have been received, and acquisition of a series of pieces of content information does not become late.

In the content holder unit of the present invention, a plurality of pieces of fragmented transmission content information transmitted from the one or two or more content holder units to the content receiver can also make up at least one series of pieces of content information; and fragmented command content information included in at least one piece of fragmented transmission content information of the plurality of pieces of fragmented transmission content information transmitted from the one or two or more content holder units to the content receiver can also be made up of additional fragmented content information included in other pieces of fragmented transmission content information transmitted from the one or two or more content holder units to the content receiver.

Even when the content receiver has failed to receive, for reasons of any error, and the like, fragmented transmission content information including fragmented command content information that can be made up of additional fragmented content information included in another fragmented transmission content information, the content receiver can acquire a series of pieces of desired content information by means of such a configuration.

In the content holder unit of the present invention, the fragmented command content information included in the respective pieces of fragmented transmission content information transmitted from the one or two or more content holder units to the content receiver can also be made up of additional fragmented content information included in other pieces of fragmented transmission content information transmitted from the one or two or more content holder units to the content receiver.

Even when the content receiver has failed to receive any of the pieces of fragmented transmission content information for reasons of any error, or the like, the content receiver can acquire a series of pieces of desired content information by means of such a configuration.

The content holder unit of the present invention may further comprise: a determination information memory section that keeps determination information which is information used in determining whether or not additional fragmented content information is included in fragmented transmission content information; and a determination section that determines whether or not additional fragmented content information is included in fragmented transmission content information, by use of the determination information, when the command information receiving section has received command information, wherein the content information configuration section may also make up fragmented transmission content information including the additional fragmented content information and the fragmented command content information when the determination section determines that additional fragmented content information is included in fragmented transmission content information; and the content information configuration section may also make up fragmented transmission content information, which is the fragmented command content information, when the determination section determines that additional fragmented content information is not included in fragmented transmission content information.

By means of such a configuration, it is possible to determine, by use of determination information, whether or not additional fragmented content information is included in fragmented transmission content information. Therefore, for instance, when it is not appropriate to cause fragmented transmission content information to include additional fragmented content information, the content holder unit can transmit fragmented transmission content information that does not include additional fragmented content information.

In the content holder unit of the present invention, the determination information is information for specifying additional fragmented content information; the determination section may determine that additional fragmented content information is included in fragmented transmission content information when additional fragmented content information is included in retained content information kept in the content holder unit; and the determination section may also determine that additional fragmented content information is not included in fragmented transmission content information when the additional fragmented content information specified by the determination information is not included in the content information held in the content holder unit.

By means of such a configuration, when the retained content information includes additional fragmented content information, fragmented transmission content information including the additional fragmented content information can be made and transmitted.

In the content holder unit of the present invention, the determination information is information showing whether or not the additional fragmented content information is included in the fragmented transmission content information; the determination section determines, by means of the determination information, that additional fragmented content information is included in fragmented transmission content information when the additional fragmented content information is shown to be included in fragmented transmission content information; and the determination section determines, by means of the determination information, that additional fragmented content information is not included in fragmented transmission content information when the additional fragmented content information is shown not to be included in fragmented transmission content information.

By means of such a configuration, it is possible to control, by means of determination information, whether or not additional fragmented content information is included in fragmented transmission content information. Therefore, determination information to the effect that additional fragmented content information is not included is previously set with regard to a content holder unit for which it is not desired to cause fragmented transmission content information to include additional fragmented content information for various reasons, thereby making it also possible to perform control operation so as to transmit fragmented transmission content information that does not include additional fragmented content information.

The content holder unit of the present invention may further comprise a change information receipt section that receives change information to the effect that the determination information is changed: and a determination information change section that changes determination information according to change information received by the change information receipt section.

By means of such a configuration, it becomes possible to change determination information, as required, by means of change information. Therefore, it becomes possible to make a change so as to achieve determination information optimum for a state according to a state of a network connected to the content holder units or another state.

Moreover, in the content holder unit of the present invention, respective pieces of fragmented command content information included in respective piece of fragmented transmission content information transmitted form the one or two or more content holder units to the content receiver may be of the same size; and the fragmented command content information and the additional fragmented content information may also be identical with each other in terms of a size.

By means of such a configuration, the position of additional fragmented content information is appropriately set with respect to fragmented command content information, whereby fragmented command content information included in each of pieces of the fragmented transmission content information can be made up of additional fragmented content information included in other pieces of fragmented transmission content information.

Further, in the content holder unit of the present invention, the fragmented command content information and the additional fragmented content information may also be adjoining data in a series of pieces of content information.

By means of such a configuration, fragmented transmission content information comes to continual data in a series of pieces of content information. Therefore, fragmented transmission content information becomes easy to make.

Moreover, in the content holder unit of the present invention, the retained content information may be fragmented content information.

By means of such a configuration, the volume of retained content information become smaller as compared with the case where the content information retained in the content holder unit is a series of pieces of content information.

In the content holder unit of the present invention, the fragmented transmission content information may be retained content information.

By means of such a configuration, retained content information itself can be brought into fragmented transmission content information, and hence fragmented transmission content becomes easy to make.

Further, in the content holder unit of the present invention, the retained content information may be a series of pieces of content information.

By means of such a configuration, the content holder unit can cause fragmented transmission content information to include arbitrary additional fragmented content information.

ADVANTAGE OF THE INVENTION

According to the content holder unit of the present invention, the content holder unit transmits, as necessary, fragmented transmission content information generated by adding additional fragmented content information to fragmented command content information. Therefore, even when a content receiver has failed to receive any of a plurality of pieces of fragmented transmission content information, the content receiver can appropriately acquire a series of pieces of content information.

BRIEF DESCRIPTION OF THE DRAWINGS

FIG. 6 is a view showing example corresponding information of the embodiment.

FIG. 7 is a view for describing a specific example of fragmented content information of the embodiment.

FIG. 8 is a view showing an example correspondence between an ID and an address of a unit of the embodiment.

FIG. 10 is a view showing example correspondence information of the embodiment.

DESCRIPTIONS OF THE REFERENCE NUMERALS AND SYMBOLS

Figure 1:
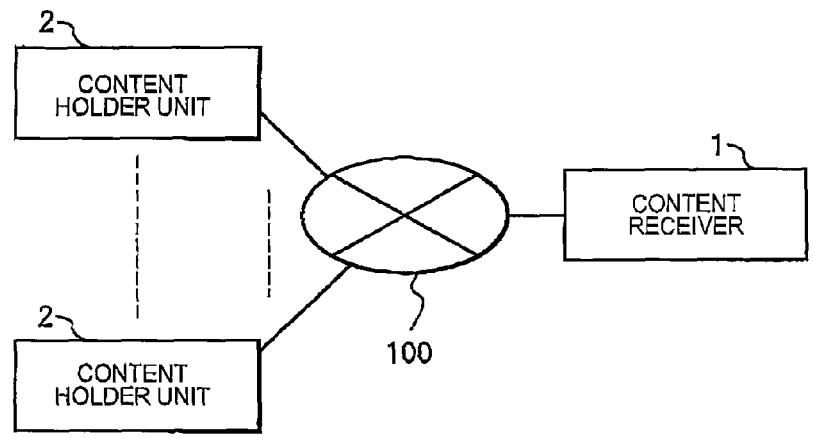
FIG. 1 is a block diagram showing a configuration of an information processing system of a first embodiment of the present invention.

1 CONTENT RECEIVER
2 CONTENT HOLDER UNIT
11 REQUEST INFORMATION RECEIVING SECTION
12 CORRESPONDENCE INFORMATION MEMORY SECTION
13 SPECIFYING SECTION
14 COMMAND INFORMATION TRANSMISSION SECTION
15 CONTENT INFORMATION RECEIVING SECTION
16 CONTENT INFORMATION STORAGE SECTION
17 CONTENT INFORMATION CONFIGURATION SECTION
18 OUTPUT SECTION
21 COMMAND INFORMATION RECEIVING SECTION
22 CONTENT INFORMATION MEMORY SECTION
23 DETERMINATION INFORMATION MEMORY SECTION
24 DETERMINATION SECTION
25 CONTENT INFORMATION CONFIGURATION SECTION
26 CONTENT INFORMATION TRANSMISSION SECTION
27 CHANGE INFORMATION RECEIPT SECTION
28 DETERMINATION INFORMATION CHANGE SECTION

BEST MODES FOR IMPLEMENTING THE INVENTION

An information communication system of the present invention is herein below described by reference to embodiments. In the following embodiments, constituent elements and steps assigned the same reference numerals are identical with or equivalent to each other, and their repeated explanations will sometimes be omitted.

First Embodiment

An information communication system of a first embodiment of the present invention will be described by reference to the drawings.

FIG. 1 is a block diagram showing a configuration of an information communication system of the present embodiment. In FIG. 1, the information communication system of the present embodiment has a content receiver 1 and a plurality of content holder units 2. The content receiver 1 and the plurality of content holder units 2 are connected to each other by means of a wired or wireless communication line 100 and can perform communication. The communication line 100 is; for instance, the Internet, an intranet, a public telephone network, and others.

Figure 2:
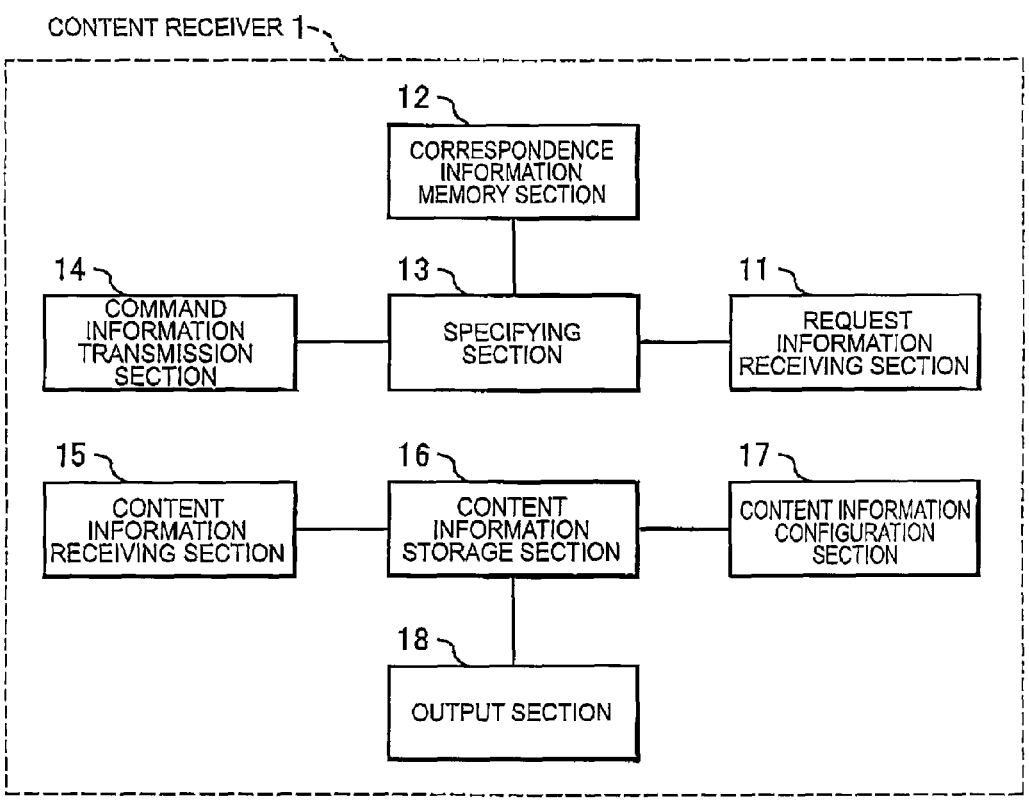
FIG. 2 is a block diagram showing a configuration of a content receiver of the embodiment.

FIG. 2 is a block diagram showing a configuration of the content receiver 1 of the embodiment. In FIG. 2, the content receiver 1 of the embodiment has a request information receiving section 11, a correspondence information memory section 12, a specifying section 13, a command information transmission section 14, a content information receiving section 15, a content information storage section 16, a content information configuration section 17, and an output section 18.

The request information receiving section 11 receives request information. The request information is information used for requesting a series of pieces of content information. A series of pieces of content information is information about the entirety of a video, audio, a video and audio, a still image, and another content. A series of pieces of content information may also be; for instance, video-audio information about one drama broadcast (for instance, video-audio information having a broadcast time of about one hour), video-audio information about one movie, or information about a certain web page. Request information received by the request information receiving section 11 is assumed to include a series-of-pieces-of-content-information ID that is information used for identifying a series of pieces of content information to be an object of request. Receipt of request information performed by the request information receiving section 11 corresponds to selection of a series-of-pieces-of-content-information ID among a plurality of series-of-pieces-of-content-information IDs.

The receiving operation referred to herein may also be receipt of information input by way of; for instance, an input device (e.g., a keyboard, a mouse, a touch panel, and the like), receipt of information transmitted over a wired or wireless communication line, or receipt of information read from a predetermined recording medium (e.g., an optical disk, a magnetic disk, semiconductor memory, and the like). The request information receiving section 11 may also include a device (e.g., a modem, a network card, or the like) used for performing receiving operation or may not include the device. Further, the request information receiving section 11 may also be implemented by hardware or software, such as a driver, for driving a predetermined device.

Correspondence information is kept in the correspondence information memory section 12. The correspondence information referred to herein is information showing correspondence between the plurality of content holder units 2 and pieces of content information held in the plurality of respective content holder units 2. The thus-retained content information is content information containing at least fragmented content information. The fragmented content information is information generated by fragmenting a series of pieces of content information. Therefore, the fragmented content information corresponds to partial information of the series of pieces of content information. The content information is a concept encompassing both a series of pieces of content information and fragmented content information. Since the retained content information associated with the content holder unit 2 by the correspondence information includes at least fragmented content information, the content information may also be the fragmented content information itself or a series of pieces of content information themselves that potentially include fragmented content information. More specifically, correspondence information may also be information having; for instance, the following pieces of information, in an associated fashion.

(1) Content Information ID
(2) Content Holder Unit ID

The content information ID referred to herein is information used for identifying content information held in the content holder unit 2. When the retained content information corresponds to a series of pieces of content information, a content information ID may also be; for instance, a series-of-pieces-of-content-information ID. Moreover, when the retained content information is fragmented content information, the content information ID may also be; for instance, a series-of-pieces-of-content-information ID and positional information that is information showing the location of fragmented content information. The content holder unit ID is information used for identifying the content holder unit 2 and may also be; for instance, a device ID of the content holder unit 2, an address of the content holder unit 2, or another information.

The correspondence information memory section 12 can be implemented by means of a predetermined recording medium (e.g., semiconductor memory, a magnetic disk, an optical disk, or the like). A process by way of which correspondence information is kept in the correspondence information memory section 12 does not matter. For instance, correspondence information may also be kept in the correspondence information memory section 12 by way of a recording medium; correspondence information transmitted over a communication line, or the like, may also be kept in the correspondence information memory section 12; or correspondence information input by way of an input device may also be kept in the correspondence information memory section 12. The correspondence information kept in the correspondence information memory section 12 may also be updated so as to reflect a state of the content information held in the content holder unit 2 in accordance with information for requesting a change transmitted from the content holder unit 2 or another unit or a server.

By use of correspondence information, the specifying section 13 specifies the plurality of content holder units 2 and at least a plurality of pieces of fragmented content information included in the pieces of content information held in the plurality of content holder units 2. Specifically, the specifying section 13 specifies the content holder unit 2 and the fragmented content information included in the content information held in the content holder unit 2 in such a way that a series of pieces of content information requested by the request information received by the request information receiving section 11 can be configured of the plurality of specified pieces of fragmented content information. The plurality of pieces of fragmented content information specified by the specifying section 13 are any fragmented content information, so long as the information can make up at least one series of pieces of content information. As will be described later, overlapping fragmented content information is also acceptable.

Specifying the content holder unit 2 may be; for instance, storing a content holder unit ID in a recording medium, or the like, or setting a flag, and the like, on a content holder unit ID in an associated manner. No limitation is imposed on a method, so long as the method makes it possible to specify the content holder unit 2. Moreover, specifying fragmented content information may correspond to; for instance, storing information that enables specification of location of fragmented content information in retained content information into a recording medium, and the like, or setting a flag, and the like, on the location of fragmented content information in retained content information in an associated manner. No limitation is imposed on a method, so long as the method makes it possible to specify fragmented content information in retained content information. Information that makes it possible to specify the location of fragmented content information in retained content information may be; for instance, information showing locations of the head and trailing end of fragmented content information in a series of pieces of content information (e.g., a portion of information ranging from a 512-byte position to a 1024-byte position in a series of pieces of content information, or a portion of information ranging from a $10^{th}$ frame position to $15^{th}$ frame position in a series of content information when the series of content information corresponds to a motion picture). When a rule for fragmenting a series of pieces of content information is previously determined, specifying information may also be information showing a sequence of pieces of fragmented content information (e.g., a third piece of fragmented content information in a series of pieces of content information, and the like).

Specification of the content holder unit 2 and fragmented content information kept in the content holder unit 2 performed by the specifying section 13 is not limited to the methods mentioned above. Needless to say, another method may also be adopted, so long as the method makes it possible to perform appropriate specification. The fragmented content information specified by the specifying section 13 is command fragmented content information to be described later.

The command information transmission section 14 transmits command information to the content holder unit 2 specified by the specifying section 13. The command information referred to herein is information that commands transmission of the fragmented content information specified by the specifying section 13 to the content receiver 1. Information that can be included in command information transmitted by the command information transmission section 14 is as follows:

(1) Information that makes it possible to specify a destination to which the content receiver 1 sends a transmission.
(2) Information that makes it possible to specify fragmented content information.

Information described in connection with (1) may also be; for instance, an address of a sender included in command information; namely, an address of the content receiver 1.

Moreover, information that makes it possible to specify the fragmented content information described in connection with (2) may also be information including only a series-of-pieces-of-content-information ID. For instance, it is assumed that retained content information is a series of pieces of content information; that a rule for fragmenting the series of content information is previously determined; and that fragmented content information of which each of the content holder units 2 takes charge is regularly determined. In such a case, it is also possible to specify fragmented content information by specifying the series of pieces of content information. Hence, information that enables specification of fragmented content information may also include only a series-of-pieces-of-content-information ID that is information for specifying a series of pieces of content information. A rule for fragmenting a series of pieces of content information is; for instance, to fragment a series of content information into 10 equal pieces, and the like. Further, a rule for fragmented content information which each of the content holder unit 2 takes charge of is; for instance, that, when a device ID of each of the content holder units 2 is represented by a decimal number, fragmented content information whose sequence is represented by the final digit of the device ID should be information which the content holder unit takes charge of. Specifically, in the case of a content holder unit 2 having a device ID "123," the third fragmented content information among the content information fragmented into 10 equal pieces is information which the content holder unit 2 takes charge of. Further, in such a case, when the content holder unit 2 holds only one series of pieces of content information, the command information may not include information that enables specification of fragmented content information, such as that described in connection with (2). The reason for this is that a series of pieces of content information can be uniquely specified without information that enables specification of fragmented content information.

When the command information transmission section 14 transmits command information to each of the plurality of content holder units 2, all pieces of the command information may be identical with each other or differ from each other. In the former case, for instance, command information brings the device ID for identifying a content holder unit 2 and information for enabling specification of fragmented content information into correspondence with each other. The content holder unit 2 received the command information may also transmit fragmented content information by use of information that enables specification of fragmented content information corresponding to its device ID. Moreover, the command information transmission section 14 may also transmit the command information to one or two content holder units 2 or more directly or by way of another server, and the like.

The command information transmission section 14 may also include a transmission device (e.g., a modem, a network card, and the like) for effecting transmission or may not include the transmission device. The command information transmission section 14 may also be implemented by hardware or software, such as a driver for driving a transmission device.

The content information receiving section 15 receives a plurality of pieces of fragmented transmission content information from two or more content holder units 2. The fragmented transmission content information will be described later. The plurality of pieces of fragmented transmission content information can make up a series of pieces of content information requested by the request information received by the request information receiving section 11.

The content information receiving section 15 may also include a receiving device for performing receiving operation (e.g., a modem, a network card, and the like) or may not include the same. The content information receiving section 15 may also be implemented by hardware or software, such as a driver for driving a receiving device.

The content information storage section 16 keeps the plurality of respective pieces of fragmented transmission content information received by the content information receiving section 15 in a predetermined recording medium. The recording medium is; for instance, semiconductor memory, an optical disk, a magnetic disk, and the like. The recording may also be provided in the content information storage section 16 or be present outside the same. The recording medium can or cannot temporarily keep fragmented transmission content information.

The content information storage section 16 can also store a series of pieces of content information made by the content information configuration section 17, which will be described later, into a predetermined recording medium. In this case, in the predetermined recording medium, a domain where fragmented transmission content information is to be kept and another domain where a series of pieces of content information is to be kept may also be made up of a physically identical recording medium or physically-different recoding mediums. In the latter case, a series of pieces of content information is kept in; for instance, a hard disk drive that keeps data for a long duration of time, and fragmented transmission content information may also be kept in RAM, and the like, that temporarily keeps information.

The content information configuration section 17 can also make up a series of pieces of content information from a plurality of pieces of fragmented transmission content information stored in the content information storage section 16. For instance, fragmented transmission content information corresponding to a plurality of files may sequentially be unified, to thus make up a series of pieces of content information corresponding to a single file. As mentioned previously, the series of pieces of content information made by the content information configuration section 17 is assumed to be stored by the content information storage section 16.

As will be described later, overlaps are generally present in the plurality of transmitted pieces of fragmented content information received by the content information receiving section 15. Therefore, for instance, the content information configuration section 17 can also make up a series of overlap-free pieces of content information by deleting overlaps from any of pieces of fragmented transmission content information; or can also make up a series of overlap-free pieces of content information by extracting non-overlapping portions from a plurality of pieces of fragmented transmission content information including overlaps.

In a case where the content information receiving section 15 has received, from the content holder unit 2, a series-of-pieces-of-content-information ID and information showing the location of a fragment in conjunction with fragmented transmission content information, the pieces of information can also be used when the content information configuration section 17 makes up a series of content information. The content information configuration section 17 can also make up a series of pieces of content information by; for instance, sequentially connecting fragmented transmission content information corresponding to the same series-of-pieces-of-content-information ID, from the head to trailing end of a series of content information in accordance with the information showing the location of a fragment. When the content information receiving section 15 has not received a series-of-pieces-of-content-information ID and information showing the location of a fragment, the content information configuration section 17 can also make up a series of pieces of content information by use of information included in the fragmented transmission content information. For instance, when the fragmented content information includes a time code, a frame number, and the like, the content information configuration section 17 can also make up a series of pieces of content information from the fragmented transmission content information by use of the pieces of information.

As mentioned previously, the fragmented transmission content information generally includes overlaps. Therefore, the content information configuration section 17 determines whether or not the a video and audio pertaining to a latter half of a certain piece of fragmented transmission content information partially coincides with a video and audio pertaining to a front half of another piece of fragmented transmission content information, whereby a series of pieces of content information can also be generated. For instance, when a partial overlap exists, the coincident portion is an overlap. Therefore, as mentioned previously, for instance, the pieces of fragmented transmission content information may also be connected together by deleting the overlap.

Meanwhile, when no overlap exists, the content information configuration section 17 may also determine; for instance, whether or not a video and audio pertaining to a trailing end of a certain piece of fragmented transmission content information is seamlessly connected to a video and audio pertaining to the head of another piece of fragmented transmission content information (a seamless connection may also be determined, for instance, when the video and audio of both pieces of fragmented transmission content information are continually linked), thereby making up a series of pieces of content information. For instance, when the pieces of fragmented transmission content information are seamlessly joined together in connection with a video and audio, the two pieces of fragmented transmission content information are determined to adjoin each other (to be continual to each other). If not, other two pieces of fragmented transmission content information may also be subjected to a similar determination.

Further, when a plurality of pieces of fragmented transmission content information can be utilized as a series of pieces of content information without being configured as a series of pieces of content information, the content information configuration section 17 may not make up a series of pieces of content information. For instance, when a series of pieces of content information pertaining to a certain drama is divided into first fragmented transmission content information corresponding to the first and second parts of the drama, second fragmented transmission content information corresponding to the second and third parts of the drama, and third fragmented transmission content information corresponding to the third and first parts of the drama and when the fragmented transmission content information can be reproduced on a per-part-of-drama basis, the respective parts of the drama are sequentially reproduced by use of the first to third pieces of fragmented transmission content information, thereby yielding the same result as that yielded when a drama is reproduced by making up a series of pieces of content information. Therefore, in such a case, a series of pieces of content information does not need to be made up. Further, in a case where the content information configuration section 17 does not need to make up a series of pieces of content information, the content information storage section 16 stores all pieces of fragmented transmission content information into which a series of content information are fragmented, whereupon acquisition of a series of pieces of content information is attained. Further, when a series of pieces of content information does not need to be made up, the content receiver 1 does not need to have the content information configuration section 17. Even when a series of pieces of content information does not need to be made up, processing for deleting overlaps from the fragmented transmission content information may also be performed. The reason for this is that the content information storage section 16 can curtail the amount of memory capacity of a predetermined recording medium where the fragmented transmission content information is stored.

The output section 18 outputs the series of pieces of content information stored in the content information storage section 16. The output described herein may also be attained by; for instance, reproducing and displaying a series of content information on a display device (e.g., a CRT, a liquid-crystal display, or the like); transmitting a series of pieces of content information to a predetermined device by way of a communication line, printing a series of pieces of content information by means of a printer; outputting a series of pieces of content information as sound from a speaker; and storing a series of pieces of content information in a recording medium. The output section 18 may include a device for effecting output operation (e.g., a display device, a printer, and the like) or may not include the same. Moreover, the output section 18 may also be implemented by hardware or software, such as a driver for driving the device.

Figure 3:
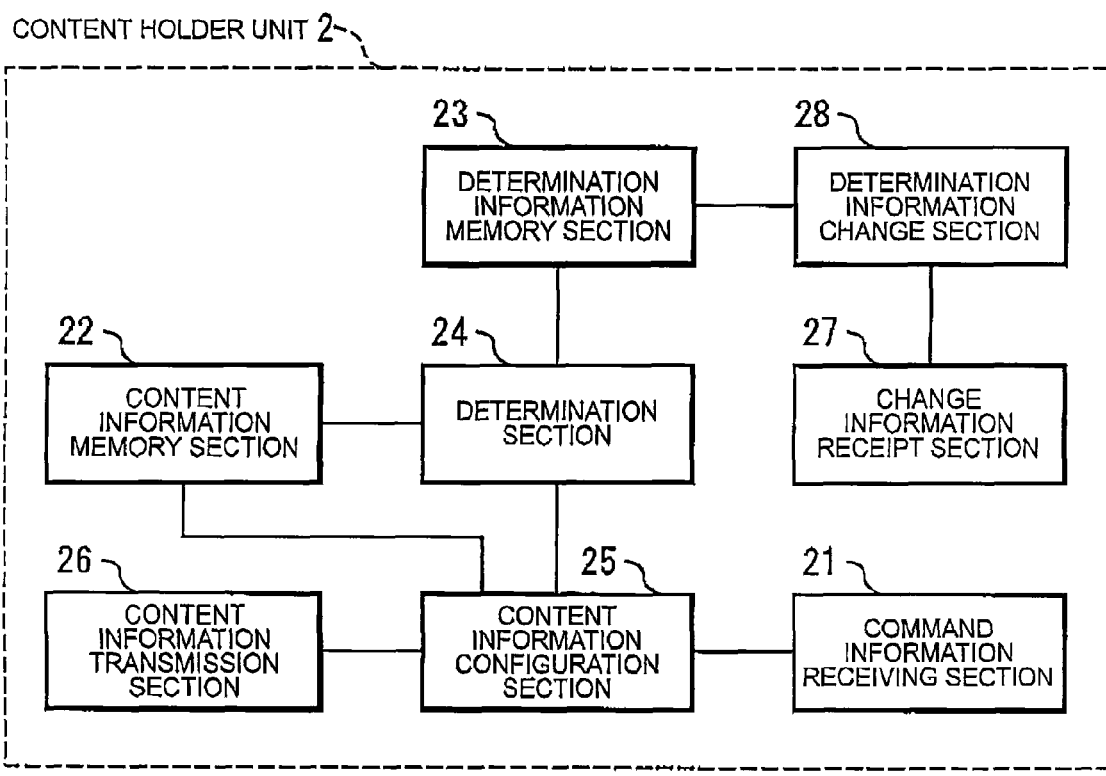
FIG. 3 is a block diagram showing a configuration of a content holder unit of the embodiment.

FIG. 3 is a block diagram showing the configuration of the content holder unit 2 of the present embodiment. In FIG. 3, the content holder unit 2 of the present embodiment has a command information receiving section 21, a content information memory section 22, a determination information memory section 23, a determination section 24, a content information configuration section 25, a content information transmission section 26, a change information receipt section 27, and a determination information change section 28. The content holder unit 2 may also be server or a terminal. The present embodiment mentions a case where the content holder unit 2 is implemented as a terminal.

The command information receiving section 21 receives command information that is information for commanding transmission of fragmented content information. The command information receiving section 21 may also or may not include a receiving device for performing receiving operation (e.g., a modem, a network card, and the like). The command information receiving section 21 may further be implemented by hardware or software, such as a driver for driving a receiving device.

The content information memory section 22 keeps retained content information. The retained content information includes at least fragmented content information into which a series of pieces of content information are fragmented. Therefore, the retained content information may also be; for instance, fragmented content information or a series of pieces of content information. The content information memory section 22 may also keep, as retained content information, a series of pieces of content information and fragmented content information in a mixed manner.

The content information memory section 22 can be implemented by a predetermined recording medium (e.g., semiconductor memory, a magnetic disk, an optical disk, and the like). A process by way of which content information is kept in the content information memory section 22 does not matter. For instance, retained content information may also be kept in the content information memory section 22 by way of a recording medium; content information transmitted over a communication line, or the like, may also be kept in the content information memory section 22; or content information input by way of an input device may also be kept in the content information memory section 22.

The determination information memory section 23 keeps determination information. Determination information corresponds to information that is used for determining whether or not fragmented transmission content information includes additional fragmented content information. Fragmented transmission content information and additional fragmented content information will be described later. Specifics of determination information do not matter, so long as the information is used in determining whether or not fragmented transmission content information includes additional fragmented content information. Specific details of the determination information will be described later.

The determination information memory section 23 can be implemented by a predetermined recording medium (e.g., semiconductor memory, a magnetic disk, an optical disk, and the like). For instance, a process by way of which determination information is kept in the determination information memory section 23 does not matter. For instance, determination information may also be kept in the determination information memory section 23 by way of a recoding medium, or the determination information input by way of an input device may also be kept in the determination information memory section 23. In the present embodiment, the determination information change section 28, which will be described later, changes the determination information kept in the determination information memory section 23. Changing operation may include storage of new determination information.

When the command information receiving section 21 has received command information, the determination section 24 determines whether or not the fragmented transmission content information include additional fragmented content information, by use of the determination information kept in the determination information memory section 23. Determination processing performed by the determination section 24 will be described later.

The content information configuration section 25 makes up fragmented transmission content information. The fragmented transmission content information usually includes fragmented command content information and additional fragmented content information. The fragmented command content information is fragmented content information included in retained content information; namely, fragmented content information used for commanding performance of transmission by means of command information received by the command information receiving section 21. The additional fragmented content information is fragmented content information that is included in the same retained content information as that including the fragmented command content information and that is different from the fragmented command content information. Specifically, fragmented command content information and additional fragmented content information, which are included in fragmented transmission content information, are included in the same retained content information. The content information configuration section 25 may fragment; for instance, retained content information, to thus generate fragmented command content information and additional fragmented content information; and may make up fragmented transmission content information including the fragmented command content information and the additional fragmented content information. Any method for making up fragmented transmission content information does not matter, so long as the content information configuration section 25 can eventually acquire fragmented transmission content information including fragmented command content information and additional fragmented content information.

When the determination section 24 determines that additional fragmented content information is included in fragmented transmission content information, the content information configuration section 25 makes up fragmented transmission content information including additional fragmented content information and fragmented command content information. When the determination section 24 determines that additional fragmented content information is not included in fragmented transmission content information, fragmented transmission content information that is fragmented command content information may also be made up. Thus, there is a case where the fragmented transmission content information made by the content information configuration section 25 includes additional fragmented content information and there is a case where the fragmented transmission content information does not include the same.

When fragmented transmission content information includes fragmented command content information and additional fragmented content information, both pieces of content information may also adjoin each other in a series of pieces of content information (i.e., consecutive data) or may not adjoin each other. When both pieces of content information adjoin each other, fragmented transmission content information becomes continual; hence, fragmented transmission content information becomes easy to make up. When both pieces of content information adjoin each other, fragmented transmission content information may also be made up on the assumption that leading and trailing ends of a series of pieces of content information are situated at a single position as if they were connected together like a circular ring.

Pieces of fragmented command content information included in respective pieces of fragmented transmission content information transmitted from the plurality of content holder units 2 to the content receiver 1 may be of the same size, and the fragmented command content information and the additional fragmented content information may be of the same size. As a result, the pieces of fragmented command content information included in the respective pieces of fragmented transmission content information transmitted from the plurality of content holder units 2 to the content receiver 1 can be made up of the pieces of additional fragmented content information included in other pieces of fragmented transmission content information transmitted from the plurality of content holder units 2 to the content receiver 1. However, the determination sections 24 of the respective content holder units 2 that transmit pieces of fragmented transmission content information must have determined that additional fragmented content information is included in fragmented transmission content information. Thus, even when the content receiver 1 cannot receive a piece of fragmented transmission content information that must have been transmitted by any content holder unit 2, the content receiver 1 can make up of a series of pieces of content information from pieces of fragmented transmission content information except the piece of fragmented transmission content information that the content receiver has failed to receive. It is preferable that the content receiver 1 can acquire a series of pieces of desired content information from pieces of additional fragmented content information included in a plurality of pieces of fragmented transmission content information transmitted from the plurality of content holder units 2.

In order to make respective pieces of fragmented command content information equal in size to each other, a series of pieces of content information may be fragmented equally in number to the content holder units 2 that transmit fragmented transmission content information including fragmented command content information. Alternatively, the size of pieces of fragmented command content information may previously be determined. A series of pieces of content information may be fragmented according to the size. Dummy data may be put in the final piece of fragmented command content information that is less than the predetermined size, and the final piece of fragmented command content information may also be realized as fragmented command content information of predetermined size.

When retained content information in the content holder unit 2 is fragmented content information, the fragmented transmission content information may also be the retained content information itself.

The content information transmission section 26 transmits the fragmented transmission content information made by the content information configuration section 25 to the content receiver 1. For instance, the content information transmission section 26 may also transmit fragmented transmission content information to the content receiver 1 by transmitting the fragmented transmission content information to a source address included in command information received by the command information receiving section 21; or may separately acquire an address of the content receiver 1 and transmit fragmented transmission content information to the thus-acquired address. The content information transmission section 26 may also transmit fragmented transmission content information directly to the content receiver 1 or by way of another server, and the like.

The content information transmission section 26 may also transmit a series-of-pieces-of-content-information ID and information showing the position of fragmented transmission content information to the content receiver 1 along with fragmented transmission content information. The reason for this is to make it possible for the content receiver 1 to make up a series of pieces of content information from the pieces of information.

The content information transmission section 26 may or may not include a transmission device for performing transmission (e.g., a modem, a network card, and the like). The content information transmission section 26 can also be implemented by hardware or software, such as a driver for driving a transmission device.

The change information receipt section 27 receives change information. The change information referred to herein means information to the effect that determination information is changed. Change information may also be; for instance, changed determination information itself, information showing a difference in change information, or other information.

Receiving operation referred to herein is; for instance, receipt of information input by way of an input device (e.g., a keyboard, a mouse, a touch panel, and the like), receipt of information transmitted over a wired or wireless communication line, or receipt of information read from a predetermined recording medium (e.g., an optical disk, a magnetic disk, semiconductor memory, and the like). The change information receipt section 27 may or may not include a device for performing receiving operation (e.g., a modem, a network card, and the like). Further, the change information receipt section 27 can also be implemented by hardware or software, such as a driver for driving a predetermined device.

The determination information change section 28 changes determination information in accordance with the change information received by the change information receipt section 27. For instance, when the change information corresponds to changed determination information, the determination information change section 28 may also store the determination information received by the change information receipt section 27 so as to be written over the determination information kept in the determination information memory section 23. When the determination information is not kept in the determination information memory section 23, the determination information received by the change information receipt section 27 may also be stored as it is in the determination information memory section 23. Further, for instance, when the changed information is information representing a difference in determination information, the determination information change section 28 may also change at least a portion of the determination information kept in the determination information memory section 23 in accordance with the change information.

Although unillustrated in FIG. 3, the content holder unit 2 can have an output section that outputs retained content information kept in the content information memory section 22. The output section may also be analogous to the output section 18 of the content receiver 1.

An explanation is now given to determination information and a determination rendered by the determination section 24. Explanations are given to three patterns; namely, (1) a pattern in which determination information is information for specifying additional fragmented content information; (2) a pattern in which determination information is information showing whether or not additional fragmented content information is included in fragmented transmission content information, and (3) a pattern in which determination information is information showing a condition for determining whether or not additional fragmented content information is included in fragmented transmission content information. Needless to say, the determination information may also be other information.

(1) Pattern in which Determination Information is Information for Specifying Additional Fragmented Content Information In this case, determination information is information for specifying additional fragmented content information. Information for specifying additional fragmented content information is information that makes it possible to specify additional fragmented content information in retained content information. The information may also be; for instance, information that make it possible to specify an absolute location of additional fragmented content information or a relative position of additional fragmented content information; namely, information that makes it possible to specify a position with respect to fragmented command content information. Determination information can also be information showing that additional fragmented content information corresponds to fragmented content information which follows a trailing end of fragmented command content information and which is of the same size as that of the fragmented command content information.

When the additional fragmented content information specified by the determination information is included in the retained content information in the content holder unit 2, the determination section 24 may determine that the additional fragmented content information is included in fragmented transmission content information. When the additional fragmented content information specified by the determination information is not included in the retained content information in the content holder unit 2, the determination section 24 may determine that the additional fragmented content information is not included in the fragmented transmission content information.

For instance, the determination information is assumed to be information showing that additional fragmented content information corresponds to fragmented content information which follows a trailing end of the fragmented command content information and which is of the same size as that of the fragmented command content information. In this case, when retained content information corresponds to a portion of a certain series of pieces of content information ranging from a 1-byte position to a 10000-byte position and when fragmented command content information corresponds to a portion of the series of pieces of content information ranging from the 1-byte position to a 4000-byte position, the determination section 24 determines that additional fragmented content information is included in fragmented transmission content information. Meanwhile, in a similar case, when retained content information corresponds to a portion of a certain series of pieces of content information ranging from a 1-byte position to a 10000-byte position and when fragmented command content information corresponds to a portion of the series of pieces of content information ranging from the 1-byte position to a 6000-byte position, the determination section 24 determines that additional fragmented content information is not included in fragmented transmission content information.

(2) Pattern in which Determination Information is Information Showing Whether or not Additional Fragmented Content Information is Included In this case, determination information is information showing whether or not additional fragmented content information is included in fragmented transmission content information. Determination information may also be; for instance, one-bit information showing whether or not additional fragmented content information is included.

When the determination information shows that additional fragmented content information is included in fragmented transmission content information, the determination section 24 may determine that additional fragmented content information is included in fragmented transmission content information. When the determination information shows that additional fragmented content information is not included in fragmented transmission content information, the determination section 24 may determine that additional fragmented content information is not included in fragmented transmission content information.

For instance, when a network to which the content holder unit 2 is connected becomes congested, determination information showing that additional fragmented content information is not included may also be set. In contrast, when the network is not congested, determination information showing that additional fragmented content information is included may also be set. The determination information change section 28 sets such determination information. Change information used for setting such determination information is assumed to be input to the change information receipt section 27 by means of; for instance, the user, another constituent element, or the like.

(3) Pattern in which Determination Information Corresponds to Information Showing a Condition for Determining Whether or not Additional Fragmented Content Information is Included In this case, determination information is information showing a condition for determining whether or not additional fragmented content information is included in fragmented transmission content information. The determination information may also be; for instance, information showing that additional fragmented content information is included when a band of a network is a predetermined threshold value or less or information showing that additional fragmented content information is included when the amount of load on the content holder unit 2 (which may also be; e.g., an activity ratio of a CPU, an activity ratio of memory, or the like) is a predetermined threshold value or less.

When the condition under which additional fragmented content information can be included in fragmented transmission content information is fulfilled, the determination section 24 may determine, by reference to the determination information, that additional fragmented content information is included in fragmented transmission content information. When the condition under which additional fragmented content information can be included in fragmented transmission content information is not fulfilled, the determination section 24 may determine, by reference to the determination information, that additional fragmented content information is not included in fragmented transmission content information.

For instance, when the band of the network to which the content holder unit 2 is connected is a predetermined threshold value or less, the determination section 24 may determine that additional fragmented content information is not included on the assumption that the condition represented by the determination information is not fulfilled. Further, when the amount of load on the content holder unit 2 is smaller than a predetermined threshold value, the determination section 24 may determine that additional fragmented content information is included on the assumption that the condition represented by the determination information is fulfilled.

In relation to a determination employing the determination information kept in the determination information memory section 23, the determination information shows inclusion of additional fragmented content information in fragmented transmission content information in the case of Pattern (2). However, when the additional fragmented content information to be included in the fragmented transmission content information is not kept in the content information memory section 22, the determination section 24 may also determine that additional fragmented content information is not included in fragmented transmission content information.

In a case other than Pattern (1), information that enables specification of additional fragmented content information is previously kept in a predetermined recording medium (not shown). The determination section 24 or the content information configuration section 25 may also make a determination or make up fragmented transmission content information by use of the information. The recording medium holding information that enables specification of additional fragmented content information may also be held in a content information configuration section 25, the determination section 24, or another constituent element.

Each of the plurality of content holder units 2 has a configuration, such as that mentioned above. Therefore, the plurality of content holder units 2 transmit a plurality of pieces of fragmented transmission content information, which enable configuration of at least one series of pieces of content information, to the content receiver 1.

As a result of additional fragmented content information being appropriately included in fragmented transmission content information, fragmented command content information included in at least one piece of fragmented transmission content information of a plurality of pieces of fragmented transmission content information transmitted from the plurality of content holder units 2 to the content receiver 1 can be made up of additional fragmented content information included in another piece of fragmented transmission content information transmitted from the plurality of content holder units 2 to the content receiver 1. However, even when the content receiver 1 has not received fragmented transmission content information including fragmented command content information that can be made up of additional fragmented content information included in another piece of fragmented transmission content information, the content receiver 1 can acquire a series of pieces of desired content information. "Another piece of fragmented transmission content information" may also be one or more pieces of fragmented transmission content information or two or more pieces of fragmented transmission content information.

Operation of the content receiver 1 of the present embodiment is now described by reference to a flowchart shown in FIG. 4.

(Step S101) The request information receiving section 11 determines whether or not request information is received. When the request information is received, processing proceeds to step S102. If not, processing proceeds to step S104.

(Step S102) The specification section 13 specifies a plurality of content holder units 2 and fragmented content information included in content information retained in the plurality of content holder units 2 so that a series of pieces of content information requested by the request information can be made up.

(Step S103) The command information transmission section 14 transmits, to the respective content holder units 2 specified by the specifying section 13, command information that commands transmission of fragmented content information specified by the specifying section 13. Processing then returns to step S101.

(Step S104) The content information receiving section 15 determines whether or not the fragmented transmission content information is received. When the fragmented transmission content information is received, processing proceeds to step S105. If not, processing proceeds to step S106.

(Step S105) The content information storage section 16 stores the fragmented transmission content information received by the content information receiving section 15 into a predetermined recording medium. Processing then returns to step S101.

(Step S106) The content information configuration section 17 determines whether or not timing for making up a series of pieces of content information is achieved. When timing for making up a series of pieces of content information is achieved, processing proceeds to step S107. If not, processing proceeds to step S109. For instance, when the content information storage section 16 has stored the amount of fragmented transmission content information that makes it possible to make up a series of pieces of content information, the content information configuration section 17 may also determine that timing for making up a series of pieces of content information is achieved.

(Step S107) The content information configuration section 17 makes up a series of pieces of content information by use of a plurality of pieces of fragmented transmission content information stored by the content information storage section 16.

(Step S108) The content information storage section 16 stores the series of pieces of content information made by the content information configuration section 17 into a predetermined recording medium. Processing then returns to step S101.

(Step S109) The output section 18 determines whether or not timing for outputting the series of pieces of content information is achieved. When the timing for outputting the series of pieces of content information is achieved, processing proceeds to step S110. If not, processing returns to step S101. For instance, when a command to the effect that a series of pieces of content information is output is input to the content receiver 1, the output section 18 may also determine that timing for outputting the series of pieces of content) information is achieved. Alternatively, when outputting of a series of pieces of content information is reserved and when a time for output has come, the output section may also determine that timing for outputting the series of pieces of content information is achieved.

(Step S110) The output section 18 reads a series of pieces of content information from the predetermined recording medium in which the content information storage section 16 has stored a series of pieces of content information, and outputs the thus-read content information. Processing then returns to step S101.

Figure 4:
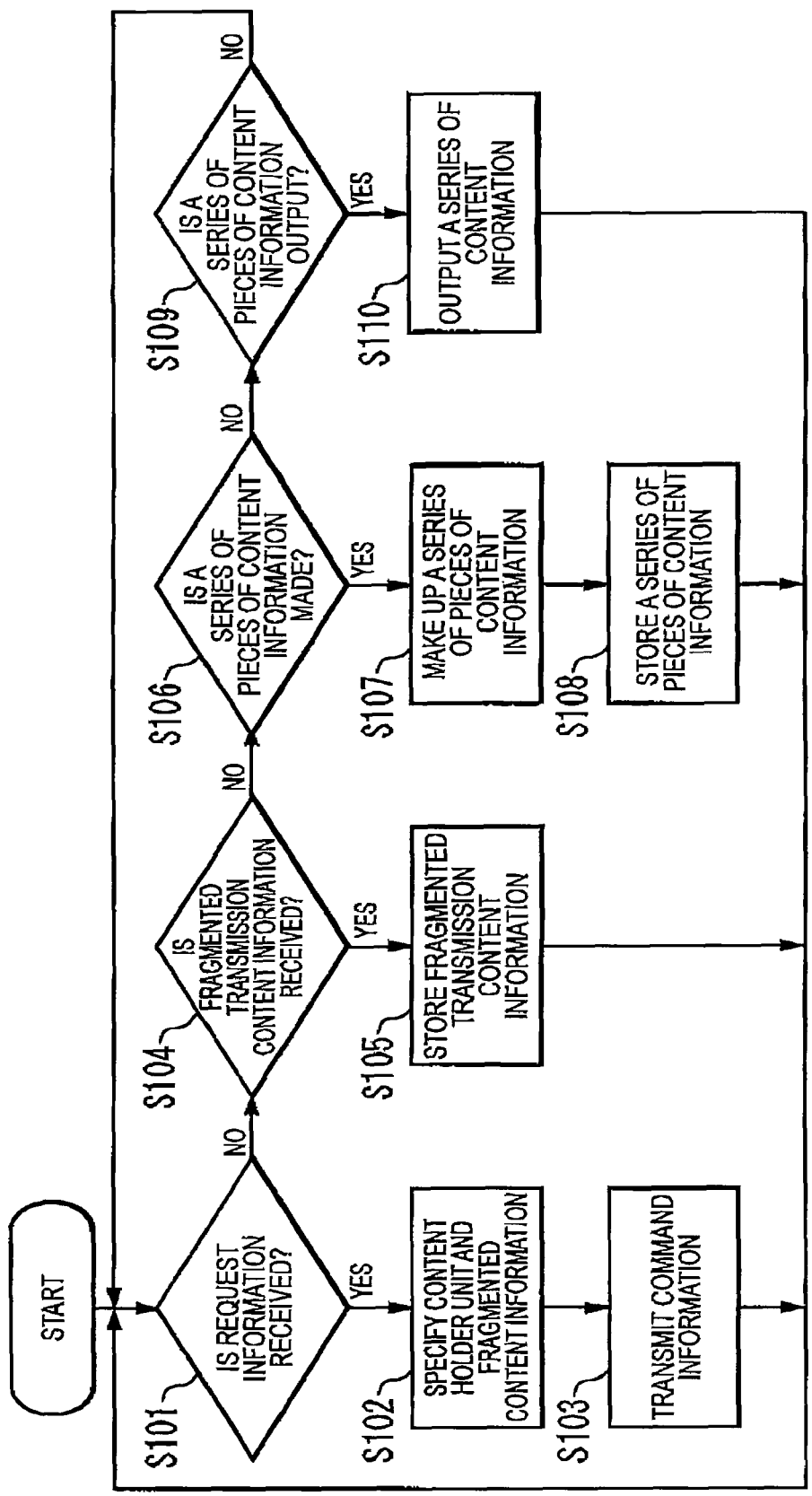
FIG. 4 is a flowchart showing operation of the content receiver of the embodiment.

In the flowchart shown in FIG. 4, processing is terminated by power cutoff or a processing termination interrupt.

Processing for determining whether or not the content receiver 1 has already kept the series of pieces of content information requested by the request information received by the request information receiving section 11 may also be additionally provided between steps S101 and S102 of the flowchart shown in FIG. 4. Determination processing may also be performed by; for instance, the specifying section 13 or another constituent element. Determination processing may also be performed by means of; for instance, the specifying section 13, and the like, making an access to the predetermined recording medium, where the series of pieces of content information is stored by the content information storage section 16, by way of an unillustrated line. When the series of pieces of content information requested by the request information is already kept in the content receiver 1, processing returns to step S101. If not, processing may proceed to step S102. As a result, the content receiver 1 can avoid transmission of command information for acquiring the series of pieces of already-kept content information to the content holder unit 2, so that performance of unwanted processing can be prevented.

Operation of the content holder unit 2 of the present embodiment is now described by reference to a flowchart shown in FIG. 5.

(Step S201) The command information receiving section 21 determines whether or not command information is received. When the command information is received, processing proceeds to step S202. If not, processing proceeds to step S207.

(Step S202) The determination section 24 makes a determination as to whether or not additional fragmented content information is included in fragmented transmission content information, by use of the determination information kept in the determination information memory section 23. When additional fragmented content information to be included in fragmented transmission content information is not included in retained content information, the determination section 24 may also determine that additional fragmented content information is not included in fragmented transmission content information.

(Step S203) When the determinations section 24 has determined that additional fragmented content information is included in fragmented transmission content information, processing proceeds to step S204. If not, processing proceeds to step S205.

(Step S204) The content information configuration section 25 makes up fragmented transmission content information including fragmented command content information and additional fragmented content information, in accordance with the command information received by the command information receiving section 21.

(Step S205) The content information configuration section 25 makes up fragmented transmission content information including fragmented command content information, in accordance with the command information received by the command information receiving section 21.

(Step S206) The content information transmission section 26 transmits the fragmented transmission content information made by the content information configuration section 25 to the content receiver 1. Processing then returns to step S201.

(Step S207) The change information receipt section 27 determines whether or not change information is received. When the change information is received, processing proceeds to step S208. If not, processing returns to step S201.

(Step S208) The determination information change section 28 changes determination information in accordance with the change information received by the change information receipt section 27. Processing then returns to step S201.

Figure 5:
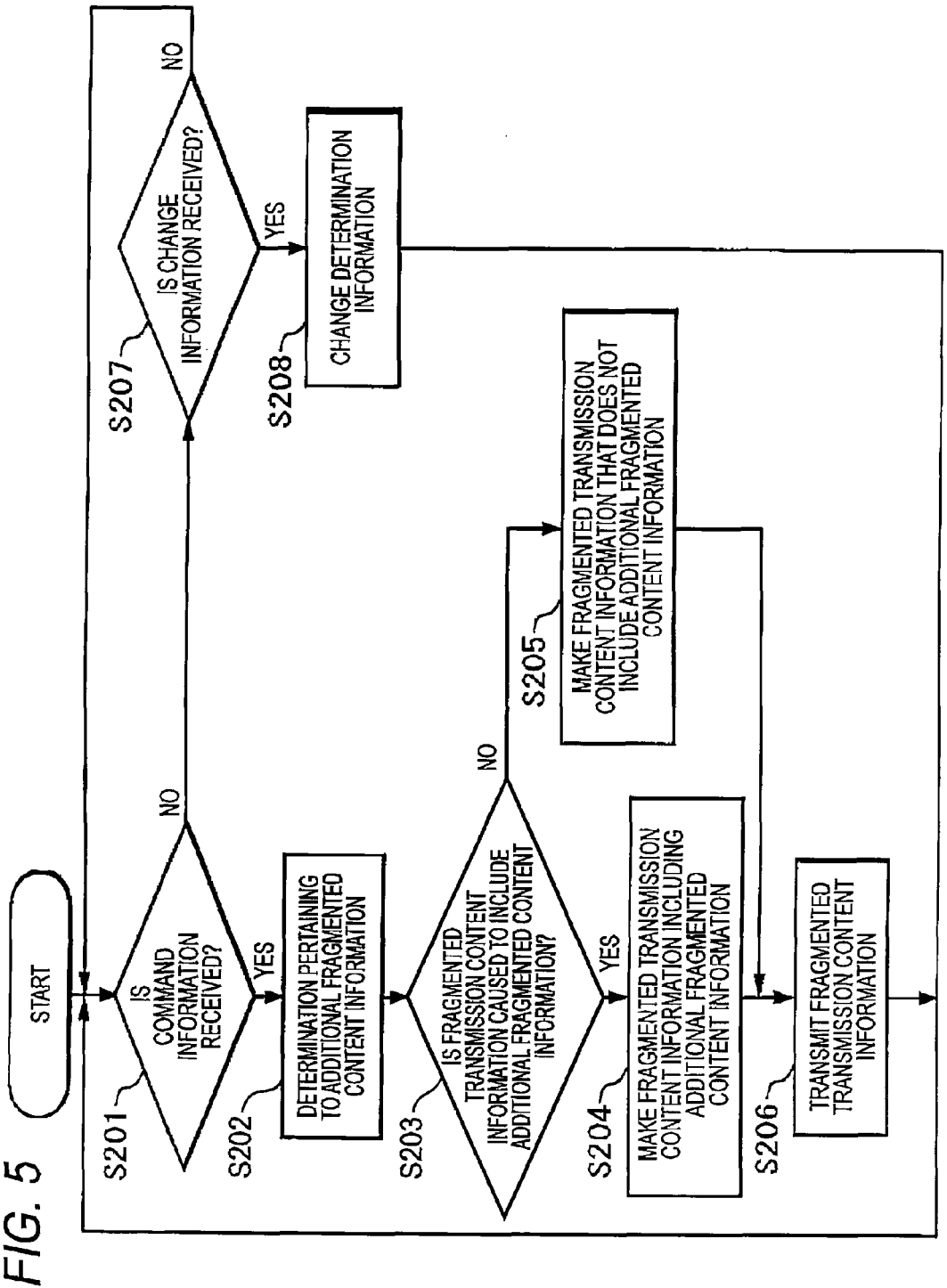
FIG. 5 is a flowchart showing operation of the content holder unit of the embodiment.

In the flowchart shown in FIG. 5, processing is terminated by power off or a processing termination interrupt.

Operation of the information communication system of the present embodiment is now described by reference to a specific example.

In the specific example, the content receiver 1 and the content holder units 2 each are assumed to be a hard disk recording-and-reproducing unit that is connected to a display; that outputs content information on the display; that transmits and receives content information; and that stores content information in a hard disk drive.

The correspondence information memory section 12 of the content receiver 1 is assumed to keep correspondence information shown in FIG. 6. In the correspondence information shown in FIG. 6, a content information ID and a content holder unit ID are brought into correspondence with each other. The content information ID includes a series-of-pieces-of-content-information ID and positional information. Positional information is information that shows the location of retained content information in a series of pieces of content information. For instance, in the first record of correspondence information shown in FIG. 6, the positional information shows that retained content information corresponds to a series of pieces of content information. For instance, a series of pieces of content information identified by a series-of-pieces-of-content-information ID "FC001" is understood, from the correspondence information shown in FIG. 6, to be kept in respective content holder units 2 identified by content holder unit IDs "A001," "A002," "A003," and "A004." A series of pieces of content information identified by a series-of-pieces-of-content-information ID "FC001" is also called sometimes a series of pieces of content information "FC001." It is assumed that the same also applies to other pieces of content information and the content holder units 2. It is preferable that the correspondence information kept in the correspondence information memory section 12 be updated in accordance with; for instance, a change in the retained content information in the content holder unit 2 (e.g., addition, deletion, fragmentation, and the like, of retained content information). The correspondence information may also be updated in response to; for instance, information transmitted by the content holder unit 2 for requesting a change in correspondence information. The content holder units 2 each may transmit information for requesting a change in correspondence information; for instance, when retained content information is changed.

The specific example mentions a case where determination information is information that specifies additional fragmented content information. Moreover, the determination information is assumed to be information showing that additional fragmented content information is fragmented content information which follows a trailing end of fragmented command content information and that is of the same size as that of the fragmented command content information. Fragmented transmission content information is assumed to be made up on the assumption that the trailing end of a series of pieces of content information is followed by a leading end of the series of pieces of the content information.

First, the user is assumed to have desired to view a series of pieces of content information "FC001" by means of a hard disk recording-and-reproducing unit at home. The user operates the content receiver 1 acting as the hard disk recording-and-reproducing unit, thereby inputting a command to the effect that the series of pieces of content information "FC001" is desired to watch. The request information receiving section 11 of the content receiver 1 accepts the command (step S101). The thus-accepted series of pieces of content information "FC001" is forwarded to the specifying section 13.

Since the series of content information "FC001" received from the request information receiving section 11 is kept in the four content retainer units 2, the specifying section 13 determines to fragment the series of pieces of content information into four pieces of fragmented content information, by reference to the correspondence information shown in FIG. 6 kept in the correspondence information memory section 12. The specifying section 13 specifies the respective content holder units 2 and pieces of fragmented content information that the respective content holder units 2 take charge of, as shown in FIG. 7 (step S102). Specifically, the specifying section 13 makes up information for specifying fragmented content information corresponding to the respective content holder units 2. The information for specifying the fragmented content information includes the series-of-pieces-of-content-information ID "FC001," the positions of the leading ends of pieces of the fragmented content information that the respective content holder units 2 take charge of; and the positions of trailing ends of the pieces of the fragmented content information. For instance, in relation to the fragmented content information that the content holder unit "A001" takes charge of, the following information for specifying the fragmented content information is made.

[Information for Specifying Fragmented Content Information of the Content Holder Unit "A001"]

A series-of-pieces-of-content-information ID: FC001

Position of a leading end of fragmented content information: 1-byte

Position of a trailing end of fragmented content information: 5000-byte

Information to the effect that fragmented content information corresponds to a trailing end; for instance, a trailing end flag, and the like, may also be set on the information that specifies the fragmented content information corresponding to the trailing end of a series of pieces of content information. In the specific example, a trailing end flag is assumed to be set on information that specifies fragmented content information corresponding to a content holder unit "A004."

The specifying section 13 makes up information for specifying fragmented content information in connection with the respective content holder units "A001," "A002," "A003," and "A004"; and forwards the pieces of information for specifying the fragmented content information and corresponding content holder unit IDs to the command information transmission section 14. The command information transmission section 14 makes up a command information packet including information for specifying fragmented content information and transmits the thus-built command information packet to the content holder unit 2 corresponding to the command information (step S103).

Specifically, when the command information packet is transmitted to the content holder unit "A001," the command information transmission section 14 makes an access to information that brings the unit ID shown in FIG. 8 into correspondence with an IP address, thereby acquiring an IP address "100.100.100.101" corresponding to the content holder unit "A001." The command information packet is transmitted to the IP address. Likewise, the command information transmission section 14 transmits respective corresponding command information packets to the other content holder units "A002," "A003," and "A004."

Although FIG. 5 shows only the IP addresses, an IP address and a port number may also be brought into correspondence with a unit ID. Moreover, it is preferable that, when an IP address is changed, each of the content holder units 2 again registers the changed IP address into the content receiver 1 in such a way that the information shown in FIG. 8 is kept in an updated state.

There will now be described a case where the content holder unit "A001" transmits fragmented transmission content information to the content receiver 1. The command information receiving section 21 of the content holder unit "A001" receives the command information packet transmitted from the content receiver 1 (step S201). The command information receiving section 21 forwards an IP address of the content receiver 1 included in the command information (i.e., an IP address of the source of the command information packet) and information for specifying fragmented content information to the content information configuration section 25. The content information configuration section 25 forwards to the determination section 24 the information for specifying the fragmented content information received from the command information receiving section 21 and the command to the effect that a determination is made as to additional fragmented content information.

By reference to the determination information kept in the determination information memory section 23, the determination section 24 determines whether or not the additional fragmented content information is included in the transmission fragmented content information (step S202). Specifically, the determination information shows that additional fragmented content information is fragmented content information which follows a trailing end of fragmented command content information and which is of the same size as that of the fragmented command content information. By reference to the content information memory section 22, the determination section 24 determines, through use of information for specifying fragmented content information included in the command information received by the command information receiving section 21, whether or not it is possible to transmit fragmented content information that is of the same size as the fragmented command content information indicated by the information for specifying the fragmented content information. In this case, a series of pieces of content information is kept in the content holder unit "A001." Hence, the determination section 24 determines that additional fragmented content information can be included in the fragmented transmission content information (step S203). The determination section 24 forwards to the content information configuration section 25 a message to the effect that additional fragmented content information is included in fragmented transmission content information and information showing the location of the additional fragmented content information.

The content information configuration section 25 makes up fragmented transmission content information including fragmented command content information and additional fragmented content information (step S204). Specifically, fragmented transmission content information including fragmented command content information and additional fragmented content information is acquired, in a fragmented manner, from the series of pieces of content information "FC001" kept in the content information memory section 22. The fragmented command content information is information ranging from a one-byte position to a 5000-byte position in the series of pieces of content information "FC001" as indicated by command information. The additional fragmented content information is of the same size as the fragmented command content information and follows the fragmented command content information. Hence, the additional fragmented content information is information ranging from a 5001-byte position to a 10000-byte position in the series of pieces of content information "FC001." Therefore, the fragmented transmission content information corresponds to information ranging from the 1-byte position to the 10000-byte position in the series of pieces of content information "FC001." The content information configuration section 25 forwards to the content information transmission section 26 fragmented transmission content information acquired in a fragmented fashion from the series of pieces of content information "FC001" kept in the content information memory section 22, information for specifying the fragmented transmission content information (e.g., the series-of-pieces-of-content-information ID "FC001" and information showing the positions of leading and trailing ends of the fragmented transmission content information), and an IP address of the content receiver 1 received from the command information receiving section 21.

The content information transmission section 26 transmits to a destination, which is the IP address of the content receiver 1 received from the content information configuration section 25, a packet including the fragmented transmission content information received from the content information configuration section 25 and the information for specifying the fragmented transmission content information (step S206).

The content information receiving section 15 of the content receiver 1 receives the packet including the fragmented transmission content information transmitted from the content holder unit "A001" (step S104). The fragmented transmission content information and the information for specifying the fragmented transmission content information are forwarded to the content information storage section 16. The content information storage section 16 stores in a hard disk drive the fragmented transmission content information and the information for specifying the fragmented transmission content information while bringing them in correspondence with each other (step S105).

The content holder units "A002," "A003," and "A004" other than the content holder unit "A001" also transmit fragmented transmission content information in the same manner, and the content information storage section 16 stores the thus-transmitted fragmented transmission content information.

Figure 9:
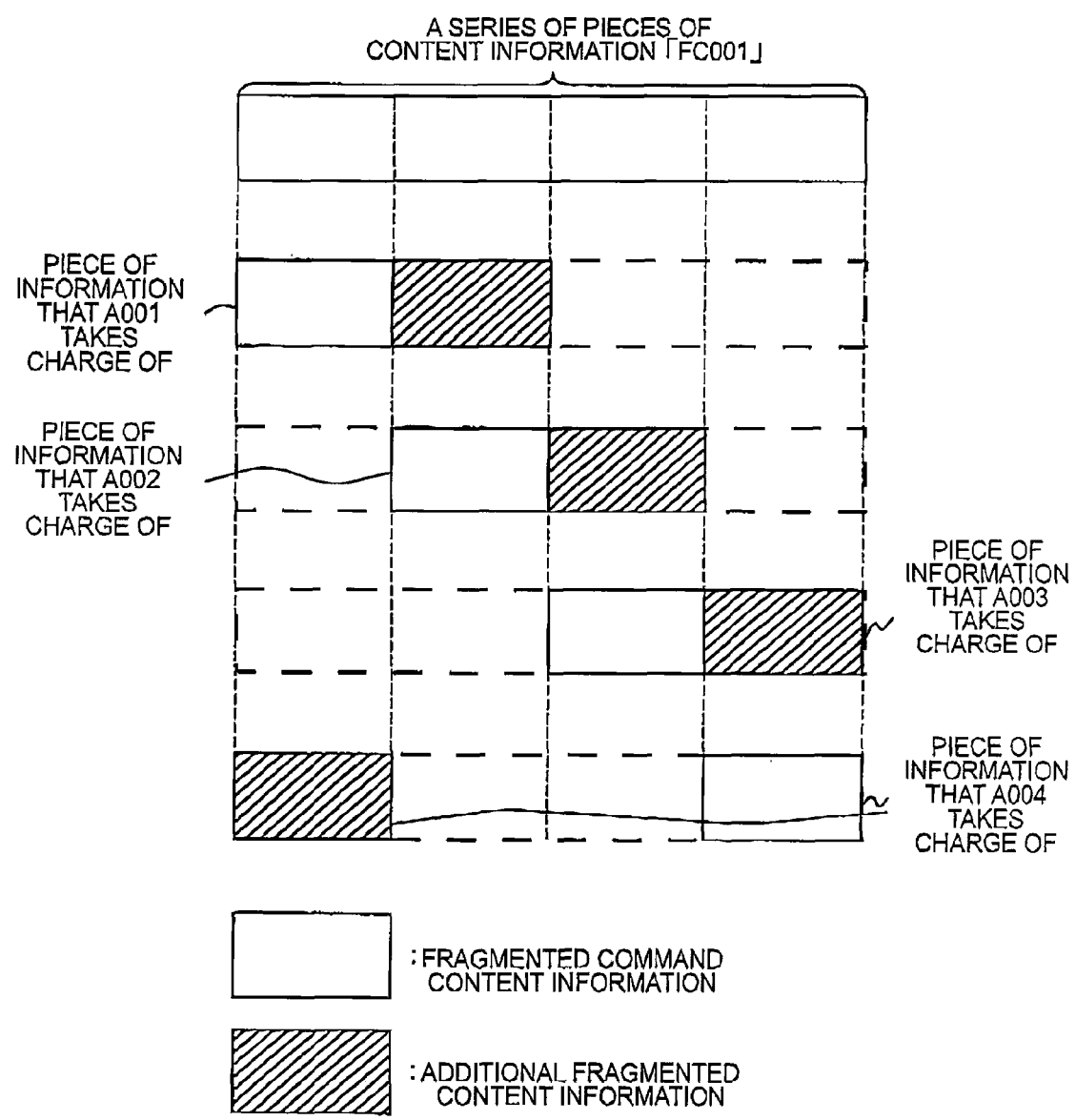
FIG. 9 is a view for describing example fragmented transmission content information of the embodiment.

FIG. 9 is a view showing pieces of the fragmented transmission content information transmitted from the respective content holder units 2. Each of the pieces of fragmented transmission content information includes fragmented command content information and subsequent additional fragmented content information that is the same size as the fragmented command content information. The fragmented transmission content information can be made redundant by causing the fragmented transmission content information to include the additional fragmented content information. Even if the content receiver 1 has failed to receive any of the pieces of the fragmented transmission content information, the content receiver 1 can make up the series of pieces of content information "FC001."

The content information configuration section 17 determines whether or not a series of pieces of content information can be made up, by reference to the fragmented transmission content information stored in the content information storage section 16 and the information for specifying the fragmented transmission content information held in correspondence with the fragmented transmission content information. Specifically, by reference to the information for specifying the fragmented transmission content information stored in the content information storage section 16, the content information configuration section 17 determines whether or not a series of pieces of content information can be made from its leading end to trailing end by means of the corresponding fragmented transmission content information. When a series of pieces of content information can be made from its leading end to trailing end, the content information configuration section 17 determines that timing for making a series of pieces of content information is achieved (step S106). A series of pieces of content information is made by connecting a plurality of pieces of fragmented transmission content information in sequence indicated by the information that specifies the fragmented transmission content information (step S107). The content information storage section 16 stores the thus-made series of pieces of content information in the hard disk drive (step S108). Subsequently, when a command, and the like, to the effect that a series of pieces of content information is output is input to the content receiver 1 from the user (step S109), the output section 18 reads the series of pieces of content information from the hard disk drive and outputs the thus-read information to the display (step S110). As a consequence, the user can watch the series of pieces of content information.

Next, operation for changing the determination information kept in the determination information memory section 23 of the content holder unit 2 is described. When a change is made to determination information showing that the additional fragmented content information is fragmented content information which follows a trailing end of fragmented command content information and whose size is half the fragmented command content information and fragmented content information which follows a leading end of fragmented command content information and whose size is half the fragmented command content information, an unillustrated server that manages the content holder unit 2 transmits to the respective content holder units 2 change information to the effect that determination information is changed (the change information is herein assumed to be changed determination information). The change information receipt section 27 receives the change information (step S207), and the determination information kept in the determination information memory section 23 is changed as mentioned previously (step S208).

An explanation is given to a case where the content holder unit 2 holds content information as fragmented content information. As indicated by the correspondence information shown in FIG. 10, the content holder unit "A001" is assumed to hold content information as a series of pieces of content information, and the content holder units "A002," "A003," and "A004" are assumed to hold content information serving as fragmented content information.

Even in this case, the content receiver 1 is also assumed to specify the content holder unit 2 and the fragmented content information as in the case with the foregoing specific example (step S102), and command information is assumed to be transmitted to the respective content holder units 2 (step S103). Since operation of the content holder unit "A001" is analogous to that mentioned in connection with the specific example, and hence its explanation is omitted.

The command information receiving section 21 of the content holder unit "A002" receives the command information from the content receiver 1 (step S201) and determines whether or not additional fragmented content information is included in fragmented transmission content information (step S202). In relation to the determination, by reference to the content information kept in the content information memory section 22, the determination section 24 determines that additional fragmented content information cannot be included in fragmented transmission content information, because fragmented command content information; namely, fragmented content information of the same size following the information ranging from a 5001-byte position to a 10000-byte position in the series of pieces of content information "FC001" is not included in the hold content information (step S203); and sends a message to that effect to the content information configuration section 25. The content information configuration section 25 then makes up fragmented transmission content information not including additional fragmented content information (step S205). Specifically, in this case, the fragmented transmission content information becomes equal to the fragmented command content information. The content information configuration section 25 forwards to the content information transmission section 26 fragmented transmission content information, information for specifying the fragmented transmission content information, and an IP address of the content receiver 1 received from the command information receiving section 21.

The content information transmission section 26 transmits to the IP address of the content receiver 1 received from the content information configuration section 25, which serves as a destination, a packet including the fragmented transmission content information received from the content information configuration section 25 and the information for specifying the fragmented transmission content information (step S206). Subsequent operation is analogous to the corresponding part described in connection with the foregoing specific example, and hence its explanation is omitted for brevity.

Figure 11:
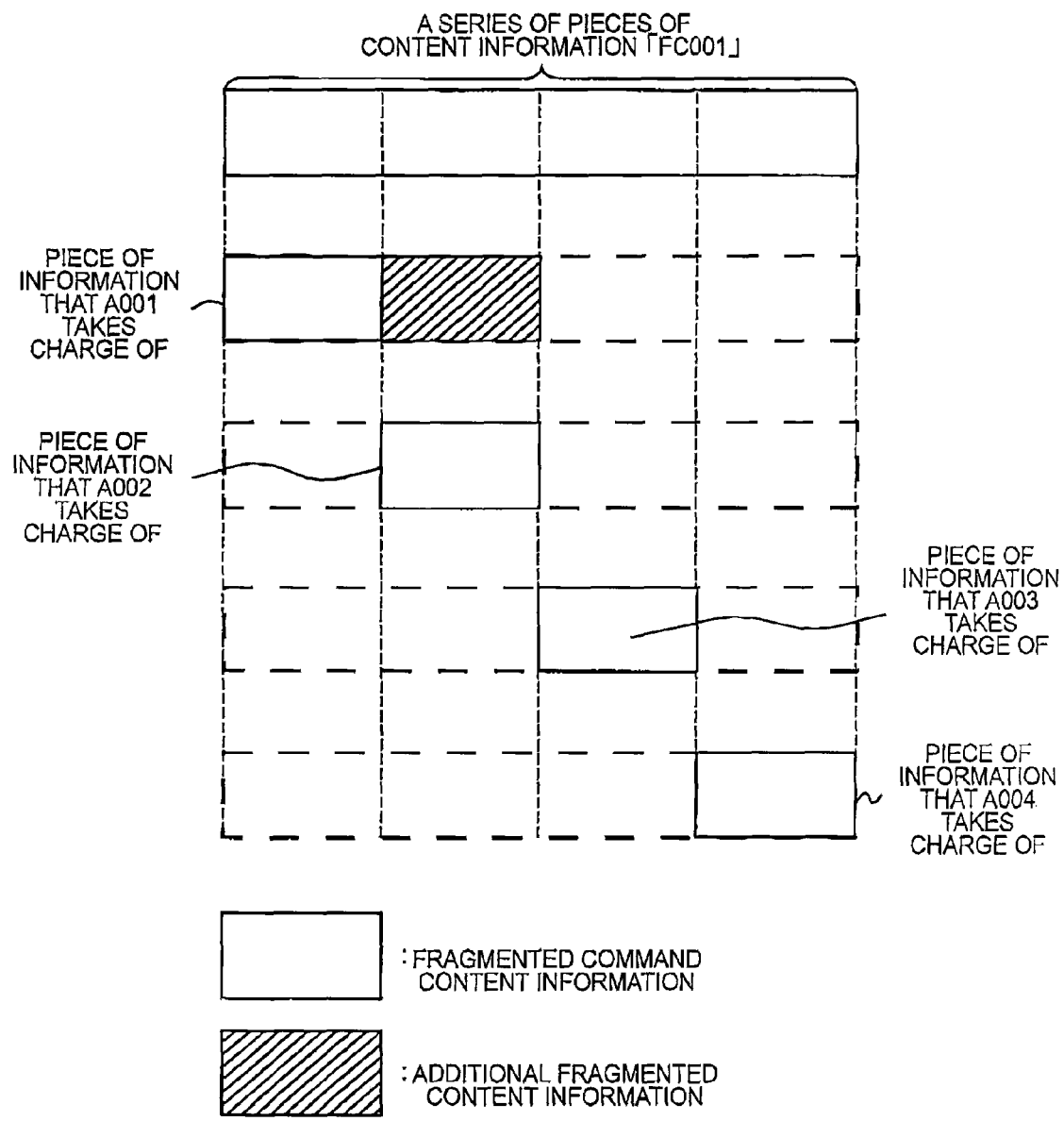
FIG. 11 is a view for describing example fragmented transmission content information of the embodiment.

FIG. 11 is a view showing fragmented transmission content information transmitted form the respective content holder units 2. The fragmented transmission content information transmitted form the content holder unit "A001" includes fragmented command content information and subsequent additional fragmented content information that is of the same size as the fragmented command content information. However, the additional fragmented content information is not included in other fragmented transmission content information. Thus, the fragmented transmission content information can be made redundant by causing at least any of the pieces of fragmented transmission content information to include additional fragmented content information. Even when the content receiver 1 has failed to receive the fragmented transmission content information transmitted from the content holder unit "A002," the content receiver 1 can make up the series of pieces of content information "FC001."

As indicated by the correspondence information shown in FIG. 10, a process through which the content holder unit 2 comes to hold content information as fragmented content information does not matter. For instance, the content holder unit 2 may in advance hold content information as a series of pieces of content information; may generate fragmented content information by fragmenting the series of pieces of content information; and may delete a series of pieces of retained content information, thereby coming to hold content information as fragmented content information. Alternatively, the content holder unit may also come to hold content information as fragmented content information acquired from another device, a recording medium, and the like.

Needless to say, the relationship between fragmented command content information and additional fragmented content information is not limited to that described in connection with the specific example. For instance, fragmented command content information and additional fragmented content information may also be data that do not adjoin each other. Moreover, the fragmented command content information may also be not identical with the additional fragmented content information in terms of a size.

As mentioned above, in the information communication system of the present embodiment, the content holder unit 2 causes fragmented transmission content information to include additional fragmented content information and transmits these pieces of information to the content receiver 1. Thereby, even when the content receiver 1 has failed to receive any of a plurality of pieces of fragmented transmission content information, the content receiver 1 can acquire a series of pieces of desired content information without retransmission of command information.

A reason why the content receiver 1 becomes unable to receive any of a plurality of fragmented transmission content information does not matter. The reason may be; for instance, because fragmented transmission content information fails to arrive at the content receiver 1 in spite of the information being transmitted by the content holder unit 2, for reasons of any error, and the like; because command information transmitted from the content receiver 1 fails to arrive at any of the content holder units 2 because of any error, and the like; because the specifying section 13 erroneously determines that content information not actually held in the content holder unit 2 is kept for reasons of a time lag between a time when an actual holding state of the content information in the content holder unit 2 is acquired and a time when the state is reflected on correspondence information, and transmits command information pertaining to fragmented command content information not kept in the content holder unit 2; and because of another error, and the like.

Moreover, since the content holder unit 2 voluntarily makes fragmented transmission content information redundant without accepting a command for making the fragmented transmission content information redundant from another device, a server, and the like, load resulting from fragmented transmission content information being redundant is not exerted on another device, a server, and others.

The present embodiment has mentioned the case where the command information is transmitted from the content receiver 1. However, this is a mere example, and command information may also be transmitted from another device, a server, and the like. For instance, a certain server keeps correspondence information, and the content receiver 1 transmits to the server a series-of-pieces-of-content-information ID of a series of pieces of desired content information. The server may specify the content holder unit 2 and the fragmented content information as does the content receiver 1 of the present embodiment, and command information may also be sent to the thus-specified content holder unit 2.

The series-of-pieces-of-content-information ID transmitted to the server may also be transmitted from a device other than the content receiver 1; for instance, a user's portable phone, and the like. When the series-of-pieces-of-content-information ID is transmitted from a device other than the content receiver 1, it is preferable to transmit information that enables specification of a destination of fragmented transmission content information; for instance, an address of the content receiver 1, and the like, to the server along with the series-of-pieces-of-content-information ID transmitted. Thus, the content receiver 1 may or may not perform other processing, so long as the content receiver receives at least fragmented transmission content information transmitted from the content holder unit 2.

Some of the plurality of content holder units 2 making up the information communication system of the present embodiment may also make fragmented transmission content information that does not include additional fragmented content information and transmit the thus-made fragmented transmission content information. Even in such a case, since the information communication system includes at least the content holder unit 2 that makes fragmented transmission content information redundant and transmits the redundant fragmented transmission content information. As a result, even when failed to receive any of pieces of fragmented transmission content information, the content receiver 1 can acquire a series of pieces of desired content information.

In the present embodiment, the command information transmitted to the respective content holder units 2 may also be identical with each other. In such a case, each of the content holder units 2 can ascertain fragmented command content information assigned to the other content holder units 2, and additional fragmented content information can be selected so that fragmented transmission content information is appropriately made redundant. For instance, a certain content holder unit 2 may also make up fragmented transmission content information while taking, as additional fragmented content information, fragmented command content information assigned to another content holder unit 2 subsequent to the fragmented command content information assigned to the content holder unit 2.

The present embodiment has described a case where the content holder unit 2 is equipped with the change information receipt section 27 and the determination information change section 28. However, this is a mere example, and the content holder unit 2 may have neither the change information receipt section 27 nor the determination information change section 28. A case where the content holder unit 2 may have neither the change information receipt section 27 nor the determination information change section 28 is; for instance, where there is no necessity for changing determination information.

The present embodiment has described the case where the content holder unit 2 has the determination information memory section 23 and the determination section 24. However, this is a mere example, and the content holder unit 2 may not have the determination information memory section 23 and the determination section 24. Even if the content holder unit does not have; for instance, the determination section 24, the content information configuration section 25 makes up fragmented transmission content information that does not include additional fragmented content information when additional fragmented content information cannot be added; for instance, when additional fragmented content information is not included in retained content information. Meanwhile, when the content information retained in the content holder unit corresponds to a series of pieces of content information, arbitrary additional fragmented content information can be included in the fragmented transmission content information. Hence, a situation in which the additional fragmented content information is not included in the retained content information does not arise.

In the present embodiment, the content receiver 1 may behave as the content holder unit 2 after having acquired a series of pieces of desired content information. In such a case, the content receiver 1 may also have the same constituent elements as those of the content holder unit 2. Likewise, the content holder unit 2 also has the same structural elements as those of the content receiver 1. A series of pieces of desired content information may also be acquired by transmitting command information to another content holder unit 2.

In the present embodiment, when each of the units has two or more constituent elements that establish communication (e.g., a transmission section, a receiving section, and the like) and when the two or more constituent elements each have a communication device, the communication device may also be a physically-identical device or physically-different devices.

In the present embodiment, there has been described a case where the information communication system has two or more content holder units 2. The information communication system may have one content holder unit 2, and two or more pieces of fragmented transmission content information may also be transmitted from the content holder unit 2. Even in such a case, the fragmented transmission content information is made redundant as described in connection with the present embodiment, whereby the content receiver 1 becomes able to acquire a series of pieces of content information even when failed to receive any of the pieces of fragmented transmission content information.

In the present embodiment, respective processing operations or respective functions may also be realized through concentrated processing performed by means of a single device or a single system or through distributed processing performed by means of a plurality of devices or systems.

In the present embodiment, each of the constituent elements may also be made up of custom-designed hardware. Constituent elements that can be implemented by means of software may also be realized by execution of a program. A program execution section, such as a CPU, reads a software program recorded in a recording medium; for instance, a hard disk drive, semiconductor memory, and the like, and executes the thus-read software program, whereby the respective constituent elements can be implemented. Software that implements the content holder unit 2 in the embodiment is the following program. Specifically, the program is for causing a computer to perform processing of a content holder unit in an information communication system having one or two or more content holder units retaining content information and a content receiver for receiving fragmented transmission content information, the program comprising: a command information receiving step of receiving command information corresponding to information for commanding transmission of fragmented content information; a content information configuration step of making up fragmented transmission content information including fragmented command content information and additional fragmented content information, the fragmented command content information corresponding to fragmented content information included in retained content information containing at least fragmented content information generated by fragmentation of a series of pieces of content information kept in the content information memory section and corresponding to fragmented content information whose transmission is commanded by means of command information received in the command information receiving step, and the additional fragmented content information corresponding to fragmented content information included in retained content information identical with the fragmented command content information and corresponding to fragmented content information differing from the fragmented command content information; and a content information transmission step of transmitting fragmented transmission content information generated in the content information configuration step.

In the program, the transmission step of transmitting information and a receiving step of receiving information do not include at least processing performed only by means of hardware; for instance, processing performed in the transmission step by a modem, an interface card, and the like.

Processing pertaining to the program may also be performed as a result of being downloaded from a server, and the like, or as a result of a program recorded in a predetermined recording medium (e.g., an optical disk or a magnetic disk, such as a CD-ROM, semiconductor memory, or the like) being read.

A computer that executes processing pertaining to a program may be singular or plural. Specifically, there may also be performed concentrated processing or distributed processing.

The present invention is not limited to the embodiment mentioned above and susceptible to various modifications. As a matter of course, the modifications also fall within the scope of the present invention.

Although the present invention has been described in detail by reference to the specific embodiment, it is manifest for those skilled in the art that the present invention is susceptible to various alterations and modifications without departing the sprit and scope of the present invention.

The present invention is based on Japanese Patent Application (JP-A-2007-123180) filed on May 8, 2007, contents of which are incorporated herein by reference.

INDUSTRIAL APPLICABILITY

As mentioned above, a content holder unit, and the like, of the present invention is useful as a content holder unit, and the like, that can make fragmented transmission content information to be sent redundant and that transmits the fragmented transmission content information.

The invention claimed is:

1. A content holder unit configuring an information communication system having one or two or more content holder units and a content receiver, the content holder unit comprising:
   a content information memory section that stores retained content information including fragmented content information in which a series of pieces of content information is fragmented by a plurality of continual records in relation to a content information ID for identifying the retained content information, and stores one or more positional information for specifying the content holder unit retaining the fragmented content information contained in the retained content information in relation to the content information ID;
   a command information receiving section that receives command information for commanding transmission of the fragmented content information;
   a content information configuration section that makes up fragmented transmission content information including fragmented command content information that is fragmented content information sent to the content receiver by the command information received by the command information receiving section, and an additional fragmented content information included in retained content information including the fragmented command content information and that is the fragmented content information differing from the fragmented command content information;

a content information transmission section that transmits fragmented transmission content information generated by the content information configuration section to the content receiver;

a determination information memory section that keeps determination information which is information used in determining whether or not additional fragmented content information is included in fragmented transmission content information; and a determination section that determines whether or not additional fragmented content information is included in fragmented transmission content information, by use of the determination information, when the command information receiving section has received command information, wherein the content information configuration section makes up fragmented transmission content information including the additional fragmented content information and the fragmented command content information when the determination section determines that additional fragmented content information is included in fragmented transmission content information; and the content information configuration section makes up fragmented transmission content information, which is fragmented command content information, when the determination section determines that additional fragmented content information is not included in fragmented transmission content information.

2. The content holder unit according to claim 1, wherein the determination information is information for specifying additional fragmented content information;

the determination section determines that additional fragmented content information is included in fragmented transmission content information when additional fragmented content information is included in the retained content information held in the content holder unit; and the determination section determines that additional fragmented content information is not included in fragmented transmission content information when the additional fragmented content information specified by the determination information is not included in the content information held in the content holder unit.

3. The content holder unit according to claim 1, wherein the determination information is information showing whether or not the additional fragmented content information is included in the fragmented transmission content information;

the determination section determines, by means of the determination information, that additional fragmented content information is included in fragmented transmission content information when the additional fragmented content information is shown to be included in fragmented transmission content information; and the determination section determines, by means of the determination information, that additional fragmented content information is not included in fragmented transmission content information when the additional fragmented content information is shown not to be included in fragmented transmission content information.

4. The content holder unit according to claim 1, further comprising:

a change information receipt section that receives change information to the effect that the determination information is changed; and a determination information change section that changes determination information according to change information received by the change information receipt section.

5. The content holder unit according to claim 1, wherein respective pieces of fragmented command content information included in respective piece of fragmented transmission content information transmitted form the two or more content holder units to the content receiver are of the same size; and the fragmented command content information and the additional fragmented content information are identical with each other in terms of a size.

6. The content holder unit according to claim 5, wherein the fragmented command content information and the additional fragmented content information are adjoining data in a series of pieces of content information.

7. The content holder unit according to claim 1, wherein the retained content information is fragmented content information.

8. The content holder unit according to claim 7, wherein the fragmented transmission content information is retained content information.

9. The content holder unit according to claim 1, wherein the retained content information is a series of pieces of content information.

* * * * *